United States Patent [19]

Turner et al.

[11] Patent Number: 4,729,537
[45] Date of Patent: Mar. 8, 1988

[54] PIPE-CHOCK

[76] Inventors: Jack F. Turner, 611 Shadyvale, Valinda; Thomas E. Rand, 14402 Fairgrove Ave., La Puente, both of Calif. 91744

[21] Appl. No.: 942,237

[22] Filed: Dec. 16, 1986

[51] Int. Cl.⁴ .............................................. F16M 13/00
[52] U.S. Cl. .................................. 248/547; 211/59.4; 211/70.4; 254/18; 410/36
[58] Field of Search ................ 248/546, 547; 211/59.4, 211/70.4, 60.1; 254/18, 25; 188/84, 32, 382; 410/36, 34, 32, 31, 42; 414/42, 745, 748

[56] References Cited

U.S. PATENT DOCUMENTS

| | | | |
|---|---|---|---|
| 571,641 | 11/1896 | Boose | 188/32 |
| 1,959,299 | 5/1934 | MacKenzie | 188/32 |
| 1,967,823 | 7/1934 | Houston | 188/32 |
| 2,611,495 | 9/1952 | Weaver | 410/42 |
| 3,091,348 | 5/1963 | Neuhauser | 211/59.4 X |
| 3,211,240 | 10/1965 | Smitter et al. | 254/18 |
| 3,658,195 | 4/1972 | Fantin | 211/60.1 |

FOREIGN PATENT DOCUMENTS 2057677 5/1972 Fed. Rep. of Germany ........ 254/18

Primary Examiner—J. Franklin Foss
Assistant Examiner—David L. Talbott
Attorney, Agent, or Firm—Cislo & Thomas

[57] ABSTRACT

A novel pipe chock having a pipe engaging surface, an upper horizontal surface, an aperture extending vertically through said chock from said horizontal surface to the base of said chock, a pair of dogs projecting upwardly from said horizontal surface and spaced laterally from each other, a lever member pivotally mounted between said dogs for rocking movement about said pivot, said lever member having an aperture formed in one end thereof in alignment with the aperture in said chock and having the other end of said lever extending beyond said dogs to a position adjacent the edge of said chock, and a spike extending through the apertures in said lever and said chock.

8 Claims, 6 Drawing Figures

PIPE-CHOCK

BACKGROUND OF THE INVENTION

This invention relates to pipe chocks and is particularly directed to pipe chocks of the type which are intended to be attached to boards or timbers used to separate layers of pipe in a storage area or when loaded onto a truck, railroad car or the like for shipment.

When a quantity of metal or ceramic pipe is to be stacked for storage or when it is loaded onto a truck or railroad car for shipment or the like, it is common practice to stack the pipe in layers which are separated by a board or timber, such as a 2×4, to prevent damage to the various lengths of pipe and to permit the prongs of a forklift truck to get between the layers of pipe to facilitate lifting and handling of the pipe. However, when this is done, any agitation of the stack may cause the pipes to roll off of the boards and the entire stack will rapidly become undone. Moreover, lengths of pipe have substantial weight and, once they start to roll, they rapidly gather momentum and become extremely dangerous to nearby people and property. In order to avoid these problems, some means must be provided to prevent the lengths of pipe from rolling. To accomplish this, in the past, it has been the practice to securely nail a large block of wood, such as a 2×4, to the subjacent board next to each end of each row or layer of pipe. These blocks of wood are called "chocks". As noted above, each length of pipe has considerable weight and, obviously, a row of pipe will have a weight equal to that of all the pipes in the row. Consequently, it has been the practice to use large spikes to secure the blocks to the underlying boards. However, if it becomes necessary or desirable to vary the number of pipe lengths in a given row or if it is desired to reuse the boards after the pipes have been removed, it becomes necessary to remove the chock in order to reposition it. Unfortunately, the same factors which make the large spikes desirable for preventing movement of the chocks and the pipes held thereby make the removal of the spikes a difficult and time-consuming job. Moreover, since the cost of labor is a major concern in such operations, the removal of the chocks also become a matter of expense.

BRIEF SUMMARY AND OBJECTS OF INVENTION

These disadvantages of the prior art are overcome with the present invention and a novel pipe chock is provided which can be quickly and easily mounted in a desired position to retain one end of a layer of pipe and which can be removed with equal ease and speed for repositioning of removal.

The advantages of the present invention are preferably attained by providing a novel pipe chock having a pipe engaging surface, an upper horizontal surface, an aperture extending vertically through said chock from said horizontal surface to the base of said chock, a pair of dogs projecting upwardly from said horizontal surface and spaced laterally from each other, a lever member pivotally mounted between said dogs for rocking movement about said pivot, said lever member having an aperture formed in one end thereof in alignment with the aperture in said chock and having the other end of said lever extending beyond said dogs to a position adjacent the edge of said chock, and a spike extending through the apertures in said lever and said chock. In use, the chock is placed in a desired position and the spike is struck with a hammer or sledge to drive it into an underlying board. This secures the chock in the desired position. When it is desired to remove the chock, for whatever purpose, the other end of the lever member is struck with the hammer or sledge which causes the lever member to rotate about its pivot and to pry the spike out of the underlying board, thereby freeing the chock for removal or replacement.

Accordingly, it is an object of the present invention to provide an improved pipe chock for securing lengths of pipe in a desired position on an underlying board or the like.

Another object of the present invention is to provide an improved pipe chock which can be mounted quickly and easily in a desired position and which can be removed with equal speed and ease when desired.

A further object of the present invention is to provide an improved pipe chock which can be installed quickly and easily and which can be removed or replaced with equal ease and speed.

A specific object of the present invention is to provide an improved pipe chock having a base member having a pipe engaging surface, an upper horizontal surface, an aperture extending vertically through said chock from said horizontal surface to the base of said chock, a pair of dogs projecting upwardly from said horizontal surface and spaced laterally from each other, a lever member pivotally mounted between said dogs for rocking movement about said pivot, said lever member having an aperture formed in one end thereof in alignment with the aperture in said chock and having the other end of said lever extending beyond said dogs to a position adjacent the edge of said chock, and a spike extending through the apertures in said lever and said chock.

These and other objects and features of the present invention will be apparent from the following detailed description taken with reference to the figures of the accompanying drawing.

DETAILED DESCRIPTION OF THE INVENTION

Figure 1:
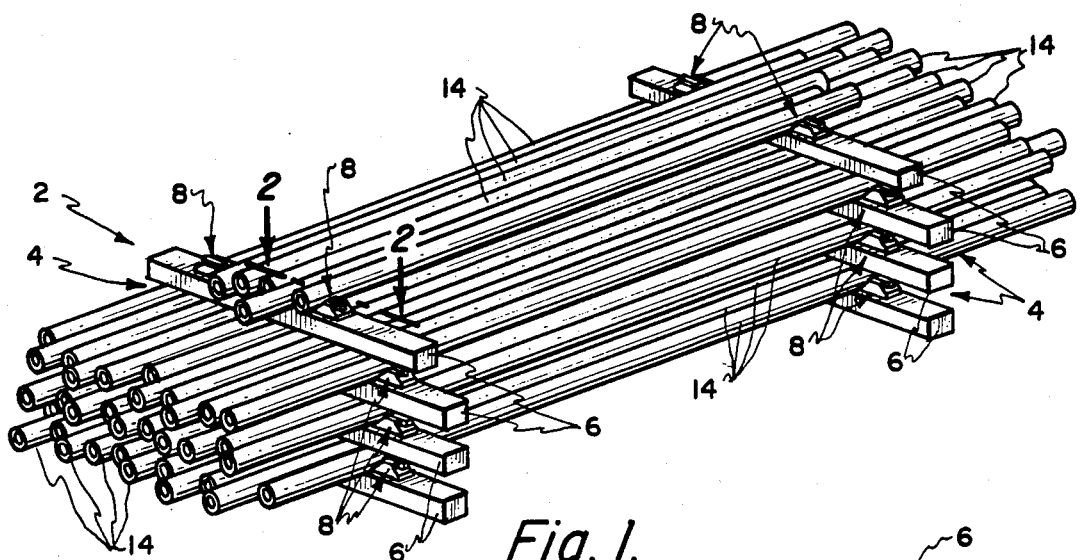
FIG. 1 is a perspective view representation showing a pipe stack secured by a plurality of pipe chocks embodying the present invention.
Figure 2:
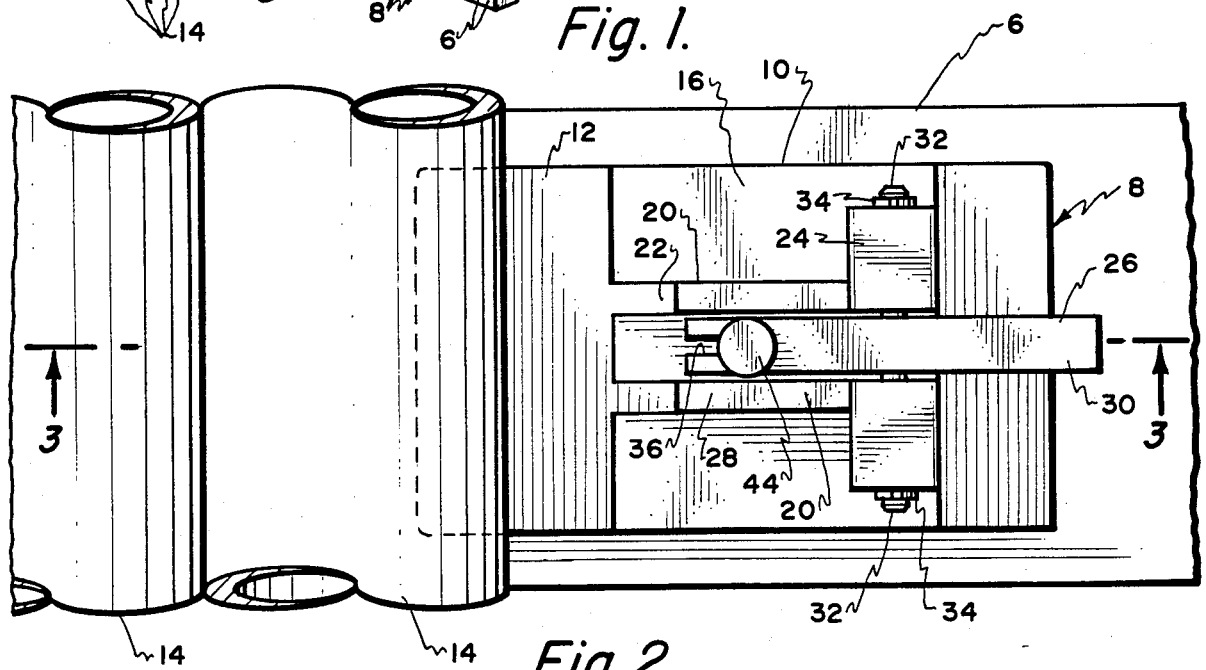
FIG. 2 is an enlarged plan view of a portion of the pipe stack of FIG. 1 looking in the direction indicated by arrows 2—2 of FIG. 1 and showing one of the pipe chocks embodying the present invention.

In that form of the present invention chosen for purposes of illustration in the drawing, FIG. 1 shows a pipe stack, indicated generally at 2, comprising a plurality of layers 4 of pipes each separated by underlying boards 6 and secured in place by a plurality of chocks 8 each embodying the present invention. As seen in the uppermost layer 4, pipe chocks 8 are provided at each end of each layer 4 and are secured to the underlying boards 6. Thus, it will be understood that additional chocks, not seen, are provided on the opposite ends of the lower layers 4 of pipe in the stack 2.

As best seen in FIGS. 2-5, each of the chocks 8 comprises a base member 10, which may be composed of plastic, wood, metal or other suitable material, having a pipe-engaging surface 12. As shown, the pipe-engaging surface is slanted. However, if desired, the surface 12 could be vertical or could be arcuately-concave to correspond generally to the curvature of the pipes 14. The upper surface 16 of the base member 10 is horizontal and an aperture 18 projects vertically downward through the base member 10 from the horizontal surface 16 to the bottom of the base member 10. A pair of laterally-spaced dogs 20 project vertically upward from the horizontal surface 16 and each of the dogs 20 is generally L-shaped, having forwardly extending legs 22 and laterally extending portions 24.

Between the dogs 20 lies an elongated lever member 26 having a forward end portion 28 and a rearward end portion 30. The lever member 26 is pivotally mounted to the laterally extending portions 24 of the dogs 20, by suitable means such as bolt 32 and lock rings 34. The rearward end portion 30 of the lever member 26 projects rearwardly beyond the edge of the horizontal surface 16 of the base member 10, while the forward end portion 28 is formed with an aperture or slot 36 which is aligned with the vertical aperture 18 extending through the base member 10. Beneath the forward end portion 28 of the lever member 26, a coil spring 38 is seated in a recess 40 of base member 10 and is retained in positioned by engagement of its upper end with the underside of the lever member 26. Finally, a spike 42 extends downwardly through the aperture 36 of lever member 26 and the aperture 18 of the base member 10 with the head 44 of the spike 42 engaging the upper surface of the lever member 26.

Figure 3:
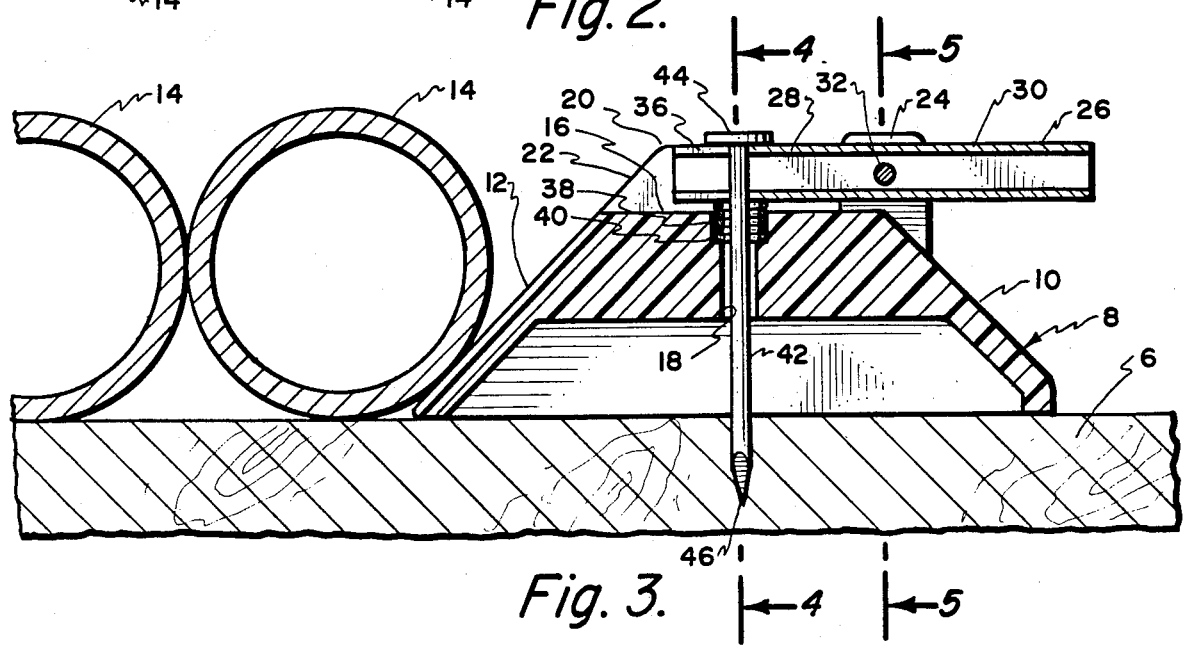
FIG. 3 is a vertical section taken along line 3—3 of FIG. 2 and the adjacent pipes and underlying board.
Figure 4:
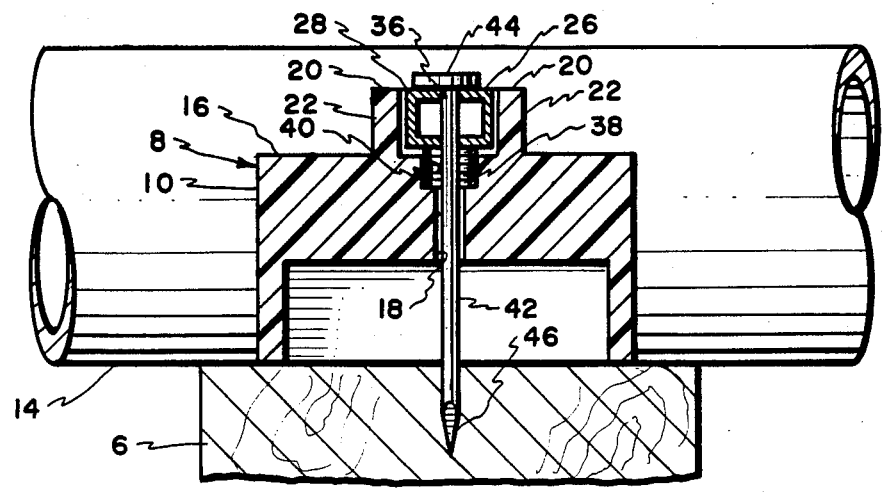
FIG. 4 is a transverse vertical section through the pipe chock of FIG. 3, taken on the line 4—4 thereof.
Figure 5:
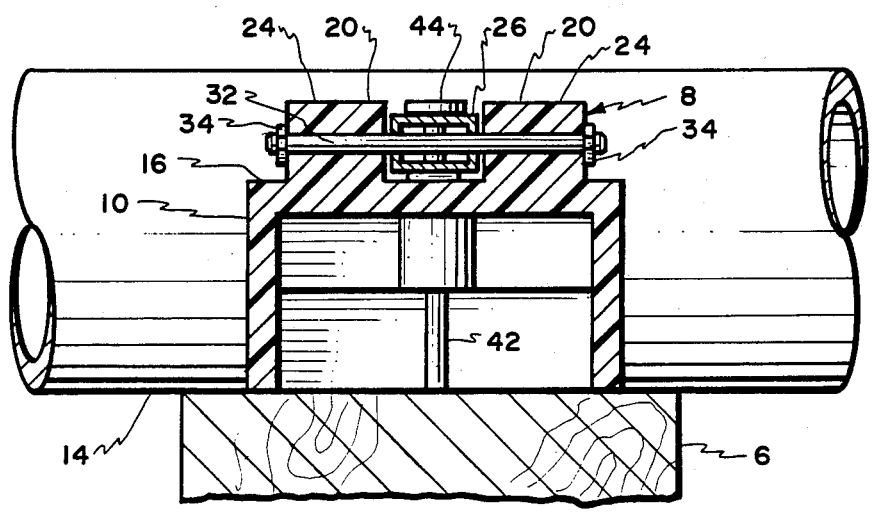
FIG. 5 is a transverse vertical section through the pipe chock of FIG. 3, taken on the line 5—5 thereof.
Figure 6:
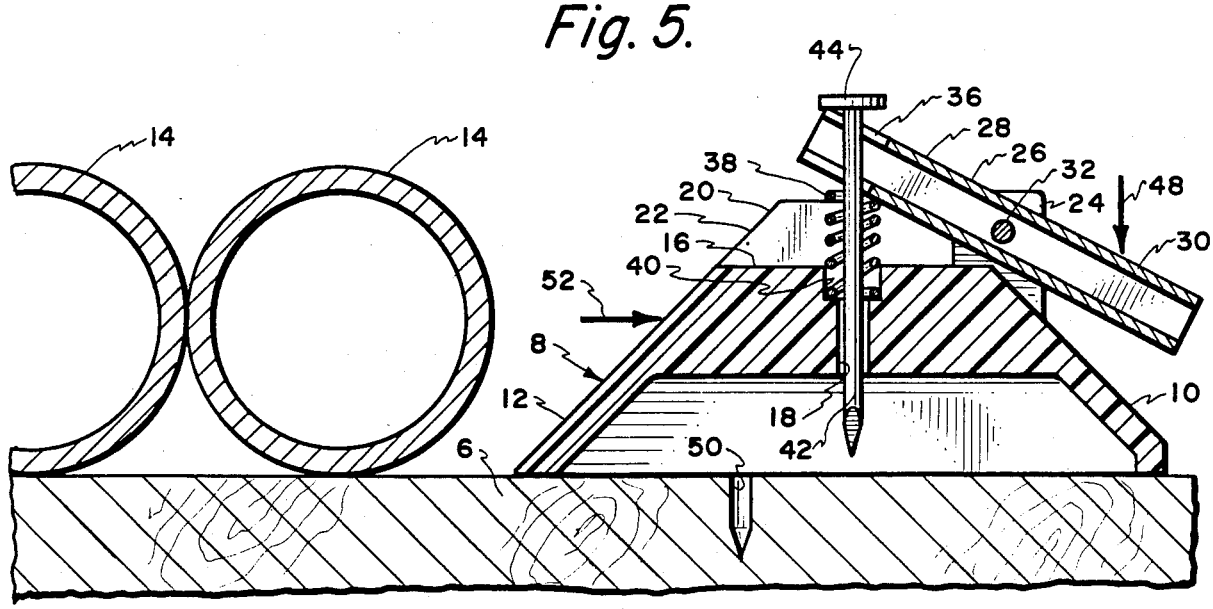
FIG. 6 is a view similar to that of FIG. 3 showing the pipe chock being removed from the position of FIG. 3.

In use, the chock 8 is placed in a desired position on an underlying board 6 and the chock is secured in position by striking the head 44 of the spike 42 with a hammer, sledge or the like to drive the spike into the underlying board 6, as seen at 46 in FIG. 3. This holds the chock 8 firmly in position and a plurality of pipes 14 may be placed on the board 6 and will be retained in position by the chock 8. Obviously, another chock 8 must be placed adjacent the other end of the pipe layer, as seen in the upper layer of FIG. 1. When it is desired to remove the chock 8, the workman strikes the rearward end 30 of the lever member 26. This drives the end 30 of lever member 26 downward, as indicated by arrow 48 of FIG. 6 which causes the lever member 26 to pivot about the bolt 32, raising the forward end 28 of lever member 26 upwardly and forcing spike 42 out of engagement with the board 6, as seen at 50 in FIG. 6. The chock 8 may then be moved away from the adjacent pipes 14, as indicated by arrow 52 in FIG. 6 for repositioning or removal.

As indicated above, the chock 8 may be formed of plastic, wood, metal or other suitable material and the shape of the pipe-engaging surface may be configured substantially as desired. Furthermore, if desired, one of the dogs 20 could be omitted and the lever member 26 could be mounted cantilever fashion from the other of the dogs 20. In addition, numerous other variations and modifications could be made without departing from the present invention. Therefore, it should be clearly understood that the forms of the present invention described above and shown in the figures of the accompanying drawing are illustrative only and are not intended to limit the scope of the present invention.

What is claimed is:

1. A pipe chock comprising a base member having a pipe engaging surface, an upper horizontal surface, an aperture extending vertically through said chock from said horizontal surface to the base of said chock;
    at least one dog projecting upwardly from said horizontal surface adjacent one side thereof,
    a lever member pivotally mounted to said dog for rocking movement about said pivot, said lever member having an aperture formed in one end thereof in alignment with the aperture in said chock and having the other end of said lever extending beyond said dog to a position adjacent the edge of said chock; and
    a spike extending through said apertures in said lever and said shock.

2. The pipe chock of claim 1 wherein said pipe-engaging surface is slanted.

3. The pipe chock of claim 1 wherein said lever member has a slot formed in the forward end thereof in alignment with the aperture in said base.

4. The pipe chock of claim 1 wherein a pair of dogs project upwardly from said horizontal surface laterally spaced from each other and said lever member is pivotally mounted between said dogs.

5. A pipe chock comprising a base member having a pipe engaging surface, an upper horizontal surface, an aperture extending vertically through said chock from said horizontal surface to the base of said chock;
    at least one dog projecting upwardly from said horizontal surface adjacent one side thereof,
    a lever member pivotally mounted to said dog for rocking movement about said pivot, said lever member having an aperture formed in one end thereof in alignment with the aperture in said chock and having the other end of said lever extending beyond said dog to a position adjacent the edge of said chock,
    a spike extending through said apertures in said lever and said chock, and
    a spring seated in a recess of the base member and retained in position by engagement of its upper end with the underside of the aperture containing end of the lever.

6. The pipe chock of claim 5 wherein said pipeengaging surface is slanted.

7. The pipe chock of claim 5 wherein said lever member has a slot formed in the forward end thereof in alignment with the aperture in said base.

8. The pipe chock of claim 5 wherein a pair of dogs project upwardly from said horizontal surface laterally spaced from each other and said lever member is pivotally mounted between said dogs.

* * * * *